US012327308B2

(12) United States Patent
Kim et al.

(10) Patent No.: US 12,327,308 B2
(45) Date of Patent: Jun. 10, 2025

(54) LEARNING NEURAL LIGHT FIELDS WITH RAY-SPACE EMBEDDING NETWORKS

(71) Applicant: Meta Platforms, Inc., Menlo Park, CA (US)

(72) Inventors: Changil Kim, Seattle, WA (US); Benjamin Attal, Pittsburgh, PA (US); Jia-Bin Huang, Fulton, MD (US); Johannes Peter Kopf, Medina, WA (US); Michael Zollhoefer, Pittsburgh, PA (US)

(73) Assignee: Meta Platforms, Inc., Menlo Park, CA (US)

( * ) Notice: Subject to any disclaimer, the term of this patent is extended or adjusted under 35 U.S.C. 154(b) by 144 days.

(21) Appl. No.: 18/073,422

(22) Filed: Dec. 1, 2022

(65) Prior Publication Data

US 2024/0185505 A1    Jun. 6, 2024

(51) Int. Cl.
*G06T 15/06* (2011.01)
*G06T 7/90* (2017.01)
*G06T 15/20* (2011.01)

(52) U.S. Cl.
CPC ............. *G06T 15/06* (2013.01); *G06T 7/90* (2017.01); *G06T 15/20* (2013.01); *G06T 2207/20081* (2013.01); *G06T 2207/20084* (2013.01)

(58) Field of Classification Search
CPC .................................................... G06T 15/06
See application file for complete search history.

(56) References Cited

U.S. PATENT DOCUMENTS

2022/0309742 A1*  9/2022  Bigos ...................... G06T 15/06
2023/0306675 A1*  9/2023  Huang .................... G06T 17/00

OTHER PUBLICATIONS

Aliev K., et al., "Neural Point-Based Graphics," arXiv: 1906. 08240v3 [cs.CV], Apr. 5, 2020, 16 pages.
Bemana M., et al., "X-Fields: Implicit Neural View-, Light- and Time-Image Interpolation," ACM Transactions on Graphics (TOG), Nov. 27, 2020, vol. 39, No. 6, pp. 1-15.
Broxton M., et al., "Immersive Light Field Video with a Layered Mesh Representation," ACM Transactions on Graphics, Article 86, Jul. 2020, vol. 39 (4), 15 pages.

(Continued)

*Primary Examiner* — Shivang I Patel
(74) *Attorney, Agent, or Firm* — BakerHostetler

(57) ABSTRACT

In particular embodiments, a computing system may access a set of training images for training a neural light field network for view synthesis. Using each training image, the computing system may train the neural light field network by casting, for each pixel of the training image, a ray into a three-dimensional (3D) space, the ray including integrated radiance along the ray, mapping first ray coordinates of the ray into an embedding network, transforming, using the embedding network, the first ray coordinates into second ray coordinates, applying positional encoding to second ray coordinates, generating, using the neural light field network, a predicted color value for the pixel based on positionally encoded second ray coordinates, comparing the predicted color value for the pixel with a ground-truth color value for the pixel, and updating the neural light field network and the embedding network based on comparison.

20 Claims, 13 Drawing Sheets
(11 of 13 Drawing Sheet(s) Filed in Color)

One evaluation per pixel

(56) References Cited

OTHER PUBLICATIONS

Buehler C., et al., "Unstructured Lumigraph Rendering," In Conference on Computer Graphics and Interactive Techniques (SIGGRAPH), Aug. 1, 2001, 9 pages.
Chabra R., et al., "Deep Local Shapes: Learning Local SDF Priors for Detailed 3D Reconstruction," European Conference on Computer Vision (ECCV), Aug. 23, 2020, pp. 608-625.
Chaurasia G., et al., et al., "Depth Synthesis and Local Warps for Plausible Image-based Navigation," ACM Transactions on Graphics, Jun. 2013, vol. 32 (3), Article 30, 12 pages.
Davis A., et al., "Unstructured Light Fields," Computer Graphics Forum, vol. 31 (2), May 2012, pp. 305-314.
Feng B.Y., et al., "Signet: Efficient Neural Representation for Light Fields," In Proceedings of the IEEE/CVF International Conference on Computer Vision (ICCV), Oct. 2021, pp. 14224-14233.
Flynn J., et al., "DeepStereo: Learning to Predict New Views from the World's Imagery," Conference on Computer Vision and Pattern Recognition, Jun. 2016, 5515-5524.
Gao C., et al., "Dynamic View Synthesis from Dynamic Monocular Video," Proceedings of the IEEE/CVF International Conference on Computer Vision (ICCV), Oct. 10-17, 2021, 10 pages.
Garbin S.J., et al., "FastNeRF: High-Fidelity Neural Rendering at 200FPS," In Proceedings of the IEEE/CVF International Conference on Computer Vision (ICCV), Oct. 2021, pp. 14346-14355.
Gortler S. J., et al., "The Lumigraph," Proceedings of the 23rd Annual Conference on Computer Graphics and Interactive techniques, Aug. 1, 1996, pp. 43-54.
Hedman P., et al., "Baking Neural Radiance Fields for Real-Time View Synthesis," International Conference on Computer Vision (ICCV), Oct. 11-17, 2021, pp. 5875-5884.
Hedman P., et al., "Casual 3D Photography," ACM Transactions on Graphics, Nov. 2017, vol. 36 (6), Article 234, pp. 1-15.
Hedman P., et al., "Deep Blending for Free-Viewpoint Image-Based Rendering," ACM Transactions on Graphics, Nov. 2018, vol. 37 (6), Article 257, pp. 1-15.
Kalantari N.K., et al., "Learning-Based View Synthesis for Light Field Cameras," ACM Transactions on Graphics (Proc. SIGGRAPH), Nov. 2016, vol. 35 (6), Article 193, 193:1-193:10, 10 pages.
Kellnhofer P., et al., "Neural Lumigraph Rendering," In Proceedings of the IEEE/CVF Conference on Computer Vision and Pattern Recognition (CVPR), Jun. 2021, pp. 4287-4297.
Kopanas G., et al., "Point-Based Neural Rendering with Per-View Optimization," Computer Graphics Forum, Jul. 15, 2021, vol. 40, No. 4, pp. 29-43.
Kopf J., et al., "One Shot 3D Photography," ACM Transactions on Graphics (Proc. SIGGRAPH), Aug. 12, 2020, vol. 39, No. 4, pp. 76:1-76:13.
Levoy M., et al., "Light Field Rendering," Proceedings of the 23rd Annual Conference on Computer Graphics and Interactive Techniques, Aug. 1, 1996, pp. 31-42.
Li Z., et al., "Neural Scene Flow Fields for Space-Time View Synthesis of Dynamic Scenes," Conference on Computer Vision and Pattern Recognition (CVPR), Jun. 2021, pp. 6498-6508.
Lindell D.B., et al., "Autoint: Automatic Integration for Fast Neural vol. Rendering," Conference on Computer Vision and Pattern Recognition (CVPR), Jun. 2021, pp. 14556-14565.
Liu L., et al., "Neural Actor: Neural Free-View Synthesis of Human Actors with Pose Control," arXiv:2106.02019, ACM Transactions on Graphics, Dec. 2021, vol. 40, No. 6, 16 pages.
Liu L., et al., "Neural Sparse Voxel Fields," Neural Information Processing Systems (NeurIPS), Dec. 6-12, 2020, 20 pages.
Lombardi S., et al., "Neural Volumes: Learning Dynamic Renderable Volumes from Images," ACM Transactions Graph, Jun. 18, 2019, vol. 38 (4), Article 65, pp. 1-14, XP081383263.
Martel J.N.P., "Acorn: Adaptive Coordinate Networks for Neural Scene Representation," ACM Transactions on Graphics, Aug. 2021, 40(4), pp. 58:1-58:13.
Martin-Brualla R., et al., "NeRF in the Wild: Neural Radiance Fields for Unconstrained Photo Collections," Conference on Computer Vision and Pattern Recognition (CVPR), Jun. 2021, pp. 7210-7219.
Mescheder L., et al., "Occupancy Networks: Learning 3D Reconstruction in Function Space," Computer Vision and Pattern Recognition (CVPR), Jun. 15-20, 2019, pp. 4460-4470.
Mildenhall B., et al., "Local Light Field Fusion: Practical View Synthesis with Prescriptive Sampling Guidelines," ACM Transactions on Graphics (TOG), Jul. 12, 2019, vol. 38 (4), pp. 1-14.
Mildenhall B., et al., "NeRF: Representing Scenes as Neural Radiance Fields for View Synthesis, " European Conference on Computer Vision (ECCV), Aug. 3, 2020, 25 pages.
Neff T., et al., "DONeRF: Towards Real-Time Rendering of Compact Neural Radiance Fields using Depth Oracle Networks," Computer Graphics Forum, Jul. 15, 2021, vol. 40, No. 4, pp. 45-59.
Oechsle M., et al., "Learning Implicit Surface Light Fields," International Conference on 3D Vision (3DV), Nov. 25, 2020, pp. 452-462.
Park J.J., et al., "DeepSDF: Learning Continuous Signed Distance Functions for Shape Representation," Computer Vision and Pattern Recognition (CVPR), Jun. 15-20, 2019, pp. 165-174.
Park K., et al., "Nerfies: Deformable Neural Radiance Fields," International Conference on Computer Vision (ICCV), Oct. 2021. pp. 5865-5874.
Peng S., et al., "Animatable Neural Radiance Fields for Modeling Dynamic Human Bodies," International Conference on Computer Vision (ICCV), Oct. 11-17, 2021, p. 14314-14323.
Penner E., et al., "Soft 3D Reconstruction for View Synthesis," ACM Transactions on Graphics, vol. 36 (6), Nov. 2017, Article 235, pp. 1-11.
Rebain D., et al., "Derf: Decom-Posed Radiance Fields," Conference on Computer Vision and Pattern Recognition (CVPR), Jun. 2021, pp. 14153-14161.
Reiser C., et al., "KiloNeRF: Speeding up Neural Radiance Fields with Thousands of Tiny MLPs." arXiv:2103.13744, Aug. 2, 2021, 11 pages.
Riegler G., et al., "Free View Synthesis," European Conference on Computer Vision (ECCV), Aug. 23, 2020, pp. 623-640.
Riegler G., et al., "Stable view Synthesis," Conference on Computer Vision and Pattern Recognition (CVPR), Jun. 2021, pp. 12216-12225.
Ruckert D., et al., "Adop: Approximate Differentiable One-Pixel Point Rendering," arXiv preprint arXiv:2110.06635, Oct. 2021, 14 pages.
Shi L., et al., "Light Field Reconstruction using Sparsity in the Continuous Fourier Domain," ACM Transactions on Graphics (TOG), Nov. 2014, vol. 34, No. 1, pp. 12:1-12:13.
Shih M-L., et al., "3D Photography using Context-Aware Layered Depth Inpainting," Computer Vision and Pattern Recognition (CVPR), Apr. 2020, pp. 8028-8038.
Shum H-Y., et al., "Review of Image-Based Rendering Techniques," Visual Communications and Image Processing, May 30, 2000, vol. 4067, 12 pages.
Sitzmann V., et al., "Scene Representation Networks: Continuous 3D Structure-Aware Neural Scene Representations," In Advances in Neural Information Processing Systems, Dec. 8-14, 2019, pp. 1121-1132.
Sitzmann V., et al., "Deepvoxels: Learning Persistent 3d Feature Embeddings," Proceedings of the IEEE!CVF Conference on Computer Vision and Pattern Recognition, Jun. 15-20, 2019, pp. 2437-2446.
Sitzmann V., et al., "Implicit Neural Representations with Periodic Activation Functions," Advances in Neural Information Processing Systems (NeurIPS), Dec. 6, 2020, 12 pages.
Sitzmann V., et al., "Light Field Networks: Neural Scene Representations with Single-Evaluation Rendering," Neural Information Processing Systems (NeurIPS 2021), Dec. 2021, 13 pages.
Tancik M., et al., "Fourier Features Let Networks Learn High Frequency Functions in Low Dimensional Domains," arXiv:2006.10739, Jun. 18, 2020, 24 pages.
Tewari A., et al., "Advances in Neural Rendering," ACM SIGGRAPH, Aug. 2021, 320 pages.

(56) References Cited

OTHER PUBLICATIONS

Tewari A., et al., "State of the Art on Neural Rendering," State of The Art Report (STAR), May 2020, vol. 39, No. 2, 27 pages.

Tretschk E., et al., "Non-Rigid Neural Radiance Fields: Reconstruction and Novel View Synthesis of a Dynamic Scene from Monocular Video," Proceedings of the IEEE/CVF International Conference on Computer Vision (ICCV), Oct. 11-17, 2021, 12 pages.

Tucker R., et al., "Single-View View Synthesis with Multiplane Images," Computer Vision and Pattern Recognition (CVPR), Jun. 2020, pp. 551-560.

Tulsiani S., et al., "Layer-Structured 3D Scene Inference via View Synthesis," European Conference on Computer Vision (ECCV), Sep. 8, 2018, pp. 311-327.

Vagharshakyan S., et al., "Light Field Reconstruction using Shearlet Transform," IEEE Transactions on Pattern Analysis and Machine Intelligence, Jan. 2017, vol. 40, No. 1, pp. 133-147.

Wilburn B., et al., "High Performance Imaging using Large Camera Arrays," ACM Transactions on Graphics (TOG), Jul. 2005, vol. 24, No. 3, pp. 765-776.

Wizadwongsa S., et al., "NeX: Real-time view Synthesis with Neural Basis Expansion," Conference on Computer Vision and Pattern Recognition (CVPR), Jun. 2021, pp. 8534-8543.

Wu G., et al., "Learning Sheared EPI Structure for Light Field Reconstruction," IEEE Transactions on Image Processing, Jul. 2019, vol. 28, No. 7, pp. 3261-3273.

Wu G., et al., "Light Field Reconstruction Using Deep Convolutional Network on EPI," Conference on Computer Vision and Pattern Recognition (CVPR), Jul. 21-26, 2017, pp. 6319-6327.

Xiang F., et al., "Neutex: Neural Texture Mapping for Volumetric Neural Rendering," Conference on Computer Vision and Pattern Recognition (CVPR), Jun. 2021, pp. 7119-7128.

Yeung H.W.F., et al., "Fast Light Field Reconstruction with Deep Coarse-to-Fine Modeling of Spatial-Angular Clues," European Conference on Computer Vision (ECCV), Sep. 2018, pp. 137-152.

Yu A., et al., "PlenOctrees for Real-Time Rendering of Neural Radiance Fields," International Conference on Computer Vision (ICCV), Oct. 2021, pp. 5752-5761.

Zhi S., et al., "In-Place Scene Labelling and Understanding with Implicit Scene Representation," International Conference on Computer Vision (ICCV), Oct. 2021, pp. 15838-15847.

Zhou T., et al., "Stereo Magnification: Learning View Synthesis using Multiplane Images," ACM Transactions Graph, Aug. 2018, vol. 37 (4), Article 65, pp. 65:1-65:12.

* cited by examiner

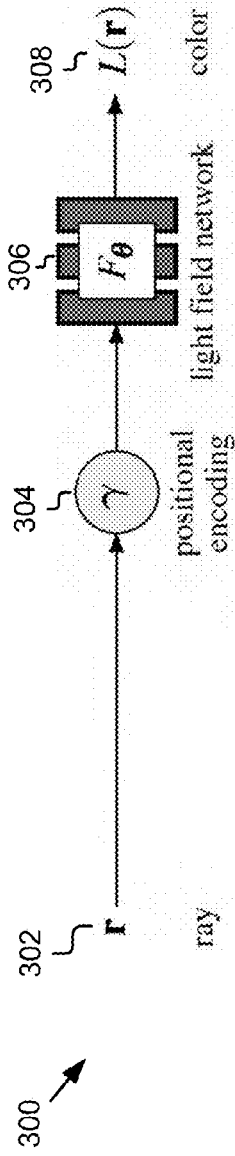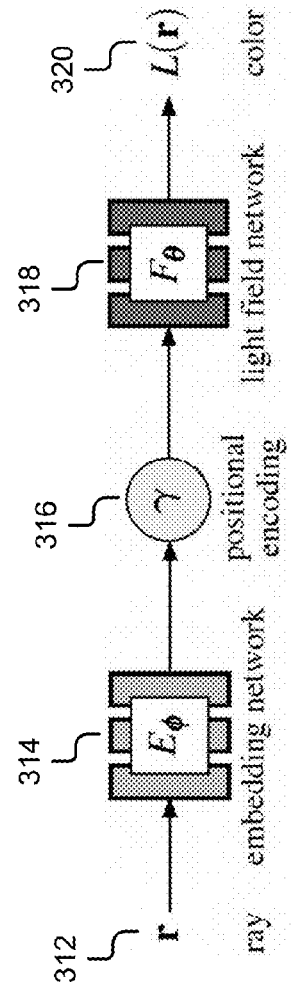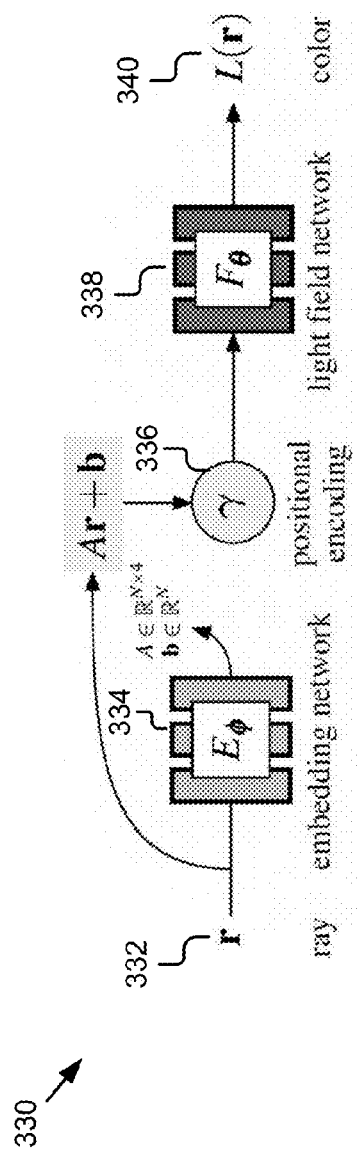

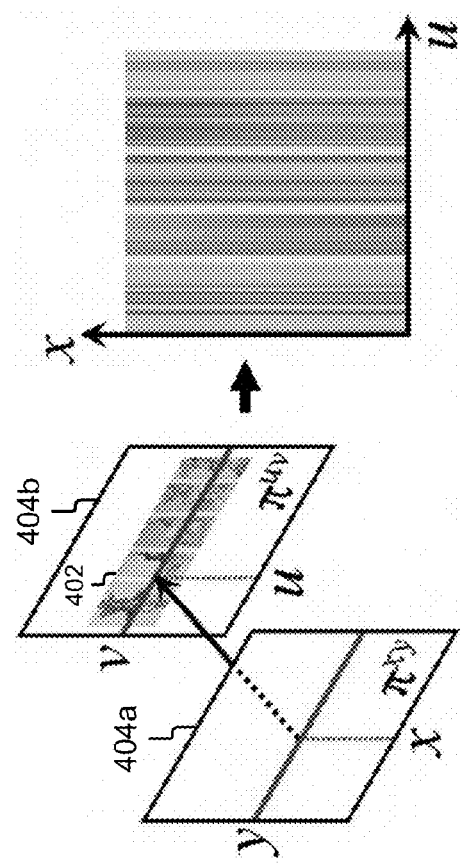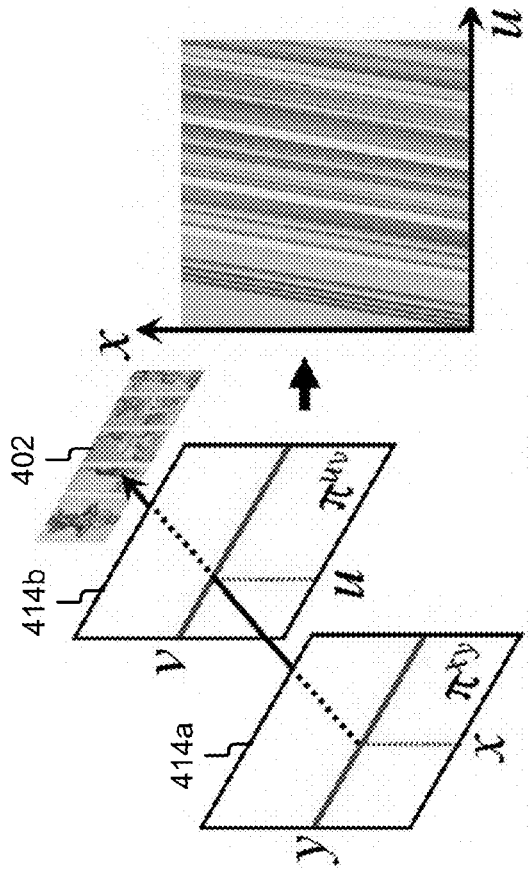
FIG. 4A (Axis-aligned Ray Space)
FIG. 4B (Non-axis-aligned Ray Space)

LEARNING NEURAL LIGHT FIELDS WITH RAY-SPACE EMBEDDING NETWORKS

TECHNICAL FIELD

This disclosure generally relates to novel view synthesis. In particular, the disclosure relates to a neural light field representation for view synthesis.

BACKGROUND

View synthesis is an important problem in computer vision and graphics. The goal of the view synthesis is to photorealistically render a scene from unobserved camera poses, given a few posed input images. Existing approaches solve this problem by optimizing an underlying functional representation of the scene's appearance and geometry, and then rendering this representation from novel views. View synthesis has recently experienced a renaissance with an explosion of interest in neural scene representations for a snapshot of the field. Neural radiance fields (NeRFs) are perhaps the most popular of these neural representations, and methods utilizing them have recently set the state-of-the-art in rendering quality for view synthesis. However, they are slow to render, requiring hundreds of network evaluations per pixel to approximate a volume rendering integral, as discussed below.

Neural radiance field (NeRF) is a technique that enables novel-view synthesis or free-viewpoint rendering (i.e., rendering of a visual scene from different views or angles). For example, if a front or a center view of a visual scene is captured using a camera (e.g., a front camera), then NeRF enables to view the objects/elements in the visual scene from different views, such as a side view or from an angle which is different from what the image was captured from. NeRF is a five-dimensional (5D) function parameterized by a multi-layer perceptron (MLP). It produces density and immediate radiance at each point in a volume. The radiance may also vary with viewing direction. One may render the color of any ray passing through the volume by evaluating the NeRF at multiple sample points along the ray, as shown for example in FIG. 1. Because the network has to be evaluated many times per ray, rendering a single image using NeRF may be very slow and costly.

The main drawback of neural radiance fields (or NeRFs) is that volume rendering requires many samples and thus many neural network evaluations per ray to accurately approximate a volume rendering integral. Thus, rendering from a NeRF is usually quite slow. Various approaches exist for baking or caching neural radiance fields into explicit data structures to improve efficiency. However, the storage cost for baked representations is much larger than that of a NeRF, and the baking procedure sometimes leads to a loss in resulting view synthesis quality. Other methods reduce the number of neural network evaluations per ray by representing radiance only on surfaces. These methods predict new images with only a few evaluations per ray, but suffer from other limitations, such as, for example, their quality is contingent on good geometry estimates, and they struggle to represent high-frequency view-dependent appearance or effects (e.g., light reflections, refractions, etc.), as well as volumetric effects and partial transparency.

Accordingly, there is a need for an improved method or technique for view synthesis that may render an image with far fewer network evaluations than existing view synthesis approaches (e.g., NeRF-based approaches), while still maintaining a small memory footprint, and also be able to better represent complex light matter interactions or view dependent effects, such as light reflections and refractions.

SUMMARY OF PARTICULAR EMBODIMENTS

Embodiments described herein relate to a novel neural light field representation for view synthesis that, in contrast to existing view synthesis techniques (e.g., NeRF), is compact and directly predicts integrated radiance along rays. Particular embodiments describe training a neural light field network for novel view synthesis using various methods, including a novel ray-space embedding approach, spatial subdivision, and soft student-teacher regularization. Trained neural light field network using the methods discussed herein supports rendering with a single network evaluation per pixel for small baseline light field datasets (also interchangeably herein referred to as small baseline input sequences or dense training datasets) and may also be applied to large baseline light field datasets (also interchangeably herein referred to as large baseline input sequences or sparse training datasets) with only a few evaluations per pixel. The neural light field representation or network achieves state-of-the-art quality on dense training datasets, such as the Stanford Light Field dataset. In addition, for forward-facing scenes with sparser inputs, a spatial subdivision method is described for training the neural light field network via local light fields. Trained neural light field network using the methods discussed herein achieves results that are competitive with existing approaches, techniques, or methods for view synthesis (e.g., NeRF-based approaches) in terms of quality while providing a better speed, quality, and memory trade-off with far fewer network evaluations.

In particular embodiments, a method for training a neural light field network uses a ray-space embedding network that maps four-dimensional (4D) ray-space manifold into an embedded latent space (e.g., intermediate and/or interpolable latent space) that facilitates both the registration of rays observing same 3D points and the interpolation of unobserved rays, which allows for both better memorization and view synthesis. While the embedding network alone already provides state-of-the-art view synthesis quality for densely sampled inputs (e.g., such as the Stanford light fields), it may not be able to handle long-range correspondences between rays in sparser input sequences (e.g., such as those from the Local Light Field Fusion dataset). To mitigate these issues, particular embodiments describe a spatial subdivision or a subdivided volume rendering method that learns a voxel grid of local light fields, where each local light field is less prone to complex occlusions and texture changes. Therefore, each local light field has to learn a simpler embedding at the price of relatively more network evaluations (e.g., one for each intersected subdivision) per ray.

In particular embodiments, training of the neural light field network discussed herein may optionally be regularized or supervised using a trained NeRF as a teacher signal. This may help bootstrap the training process. Such a regularization process for training the neural light fields may be referred to as a student-teacher regularization, where a neural light field undergoing the training is the student and a trained NeRF used for the training is the teacher. Unlike existing methods, training a neural light field using this student-teacher regularization is not capped by the teacher signal, and achieves even higher quality view synthesis than the teacher (e.g., trained NeRF).

Some of the notable features associated with the trained neural light field network for view synthesis using the methods discussed herein are, for example and not by way of limitation, as follows: (1) the neural light field network achieves better view synthesis quality than other or existing view synthesis methods (e.g., NeRF-based approaches) in both sparse and dense regimes, (2) the neural light field network is able to achieve this quality in a fraction of render time (e.g., one network evaluation per pixel) that other methods require (e.g., hundreds of network evaluations per pixel), while still maintaining a small memory footprint, (3) the neural light field network allows for high-quality view synthesis with faithful reconstruction of complex view dependent effects (e.g., light reflections and/or refractions), which were not successfully represented by existing view synthesis approaches (e.g., NeRF-based approaches), (4) the neural light field network employs a ray-space embedding network and achieves state-of-the-art quality for small-baseline view synthesis without any geometric constraints, and (5) the neural light field network is able to handle large baseline light fields via a subdivided neural light field representation that leads to a good trade-off in terms of the number of evaluations vs. quality, which can be optimized to outperform NeRF for real-world scenes.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3A illustrates a first example configuration for training a neural light field network for view synthesis.

FIG. 3B illustrates a second example configuration for training a neural light field network for view synthesis with a ray-space embedding network.

FIG. 3C illustrates a third example configuration for training a neural light field network for view synthesis with a local affine transformation-based embedding.

FIG. 4A illustrates an example axis-aligned ray space.

FIG. 4B illustrates an example non-axis-aligned ray space or an ill-parameterized ray space.

DESCRIPTION OF EXAMPLE EMBODIMENTS

Figure 9A:
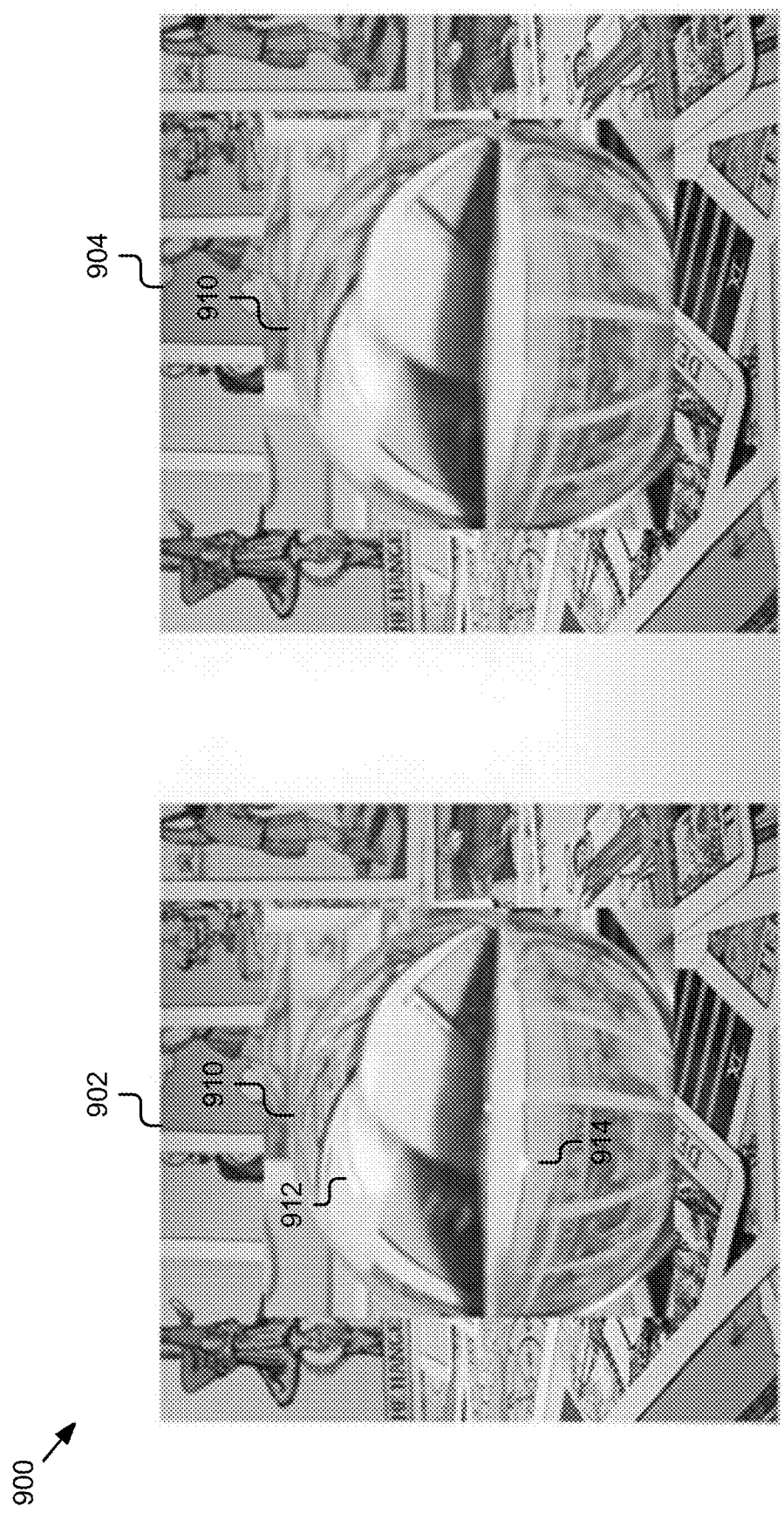
FIG. 9A-9C illustrate example comparisons between outputs generated by a neural light field discussed herein and an existing neural radiance field.
Figure 9B:
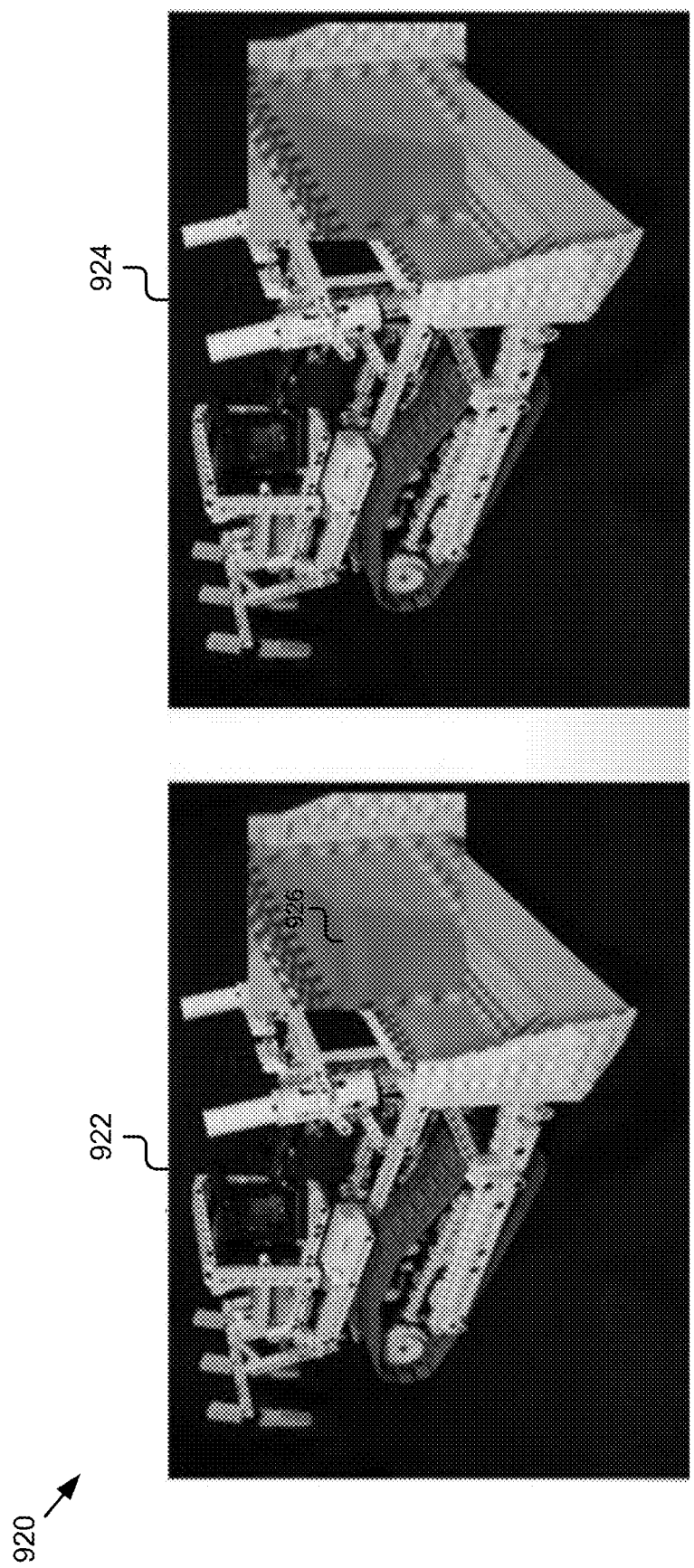
Figure 9C:

Particular embodiments discussed herein relates to novel view synthesis, which is synthesizing novel views from a collection of images from a visual scene. View synthesis is an important problem in computer vision and graphics. The goal of the view synthesis is to photorealistically render a scene from unobserved camera poses, given a few posed input images. Existing approaches solve this problem by optimizing an underlying functional representation of the scene's appearance and geometry, and then rendering this representation from novel views. Neural radiance fields (NeRFs) are perhaps the most popular of these neural representations. NeRFs produce state-of-the-art view synthesis results. However, they are slow to render, requiring hundreds of network evaluations per pixel to approximate a volume rendering integral, as shown and discussed below in reference to FIG. 1. Baking NeRFs into explicit data structures enables efficient rendering but results in a large increase in memory footprint and, in many cases, a quality reduction. For example, NeRFs fails to efficiently represent complex visual scenes with light reflections and/or refractions, as shown in FIGS. 9A-9C.

Figure 1:
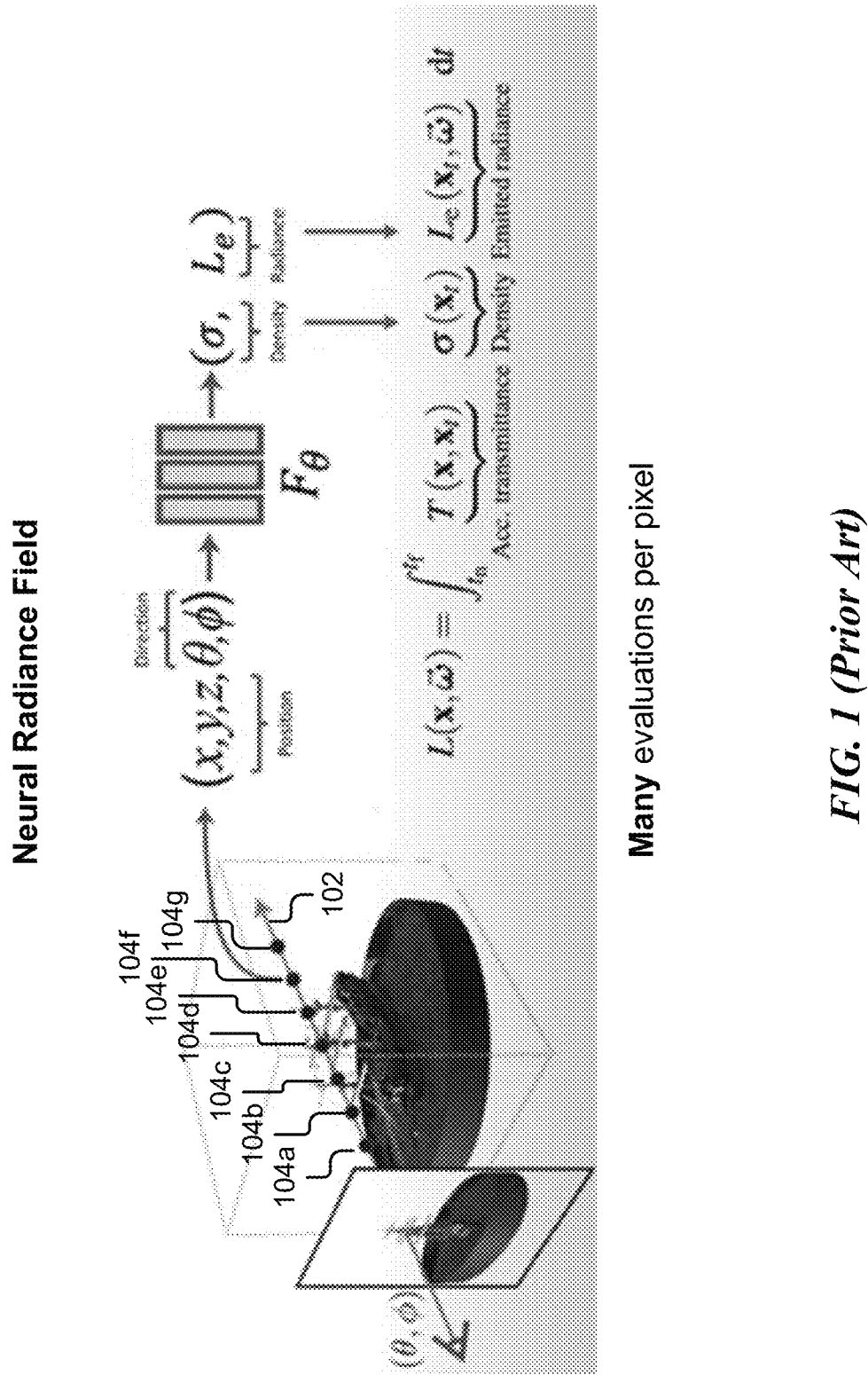
FIG. 1 illustrates an example rendering for view synthesis of a scene using an existing neural radiance field.

FIG. 1 illustrates an example rendering for view synthesis of a scene using existing NeRF. In the existing NeRF approach, a ray 102 is cast or shoot, for each pixel of an image associated with the scene, into a three-dimensional (3D) space. In NeRF, a ray is parameterized with five-dimensional (5D) coordinates, which includes X, Y, Z, $\theta$, $\phi$. Here X,Y,Z coordinates represent the position in space and $\theta$ and $\phi$ represent the direction of the ray. As the ray 102 traverses into the scene, color and opacity values are calculated for multiple sample points 104a-104g (individually and/or collectively herein referred to as 104) along the ray 102. Computing color and opacity for each sample point 104 requires multiple network evaluations per pixel in order to synthesize the image. For instance, to compute a color and opacity for each sample point 104, a function $F_\theta$ is evaluated with these 5D coordinates or parameters. NeRF represents this function $F_\theta$ with a neural network (e.g., usually a multi-layer perceptron (MLP)). For each sample point 104, 5D coordinates (X,Y,Z,$\theta$,$\phi$) are provided as inputs to the function $F_\theta$, which gives density ($\sigma$) and radiance ($L_e$) at each sample point in a volume. The radiance may also vary with viewing direction. One may render the color of any ray passing through the volume by evaluating the NeRF at multiple sample points (e.g., sample points 104) along the ray. Once color and opacity values are collected for these sample points 104, these values are combined to generate a final color for the particular pixel for which the ray 102 is cast. In particular embodiments, combining the color information of multiple sample points to generate a final color for a pixel may include approximating a volume rendering integral. Because the network has to be evaluated many times per ray, rendering a single image can be very costly and slow.

To further clarify the above, a non-limiting example is now discussed. In FIG. 1, seven sample points 104a-104g are represented on the ray 102. For each of these seven sample points, the function $F_\theta$ will be called with 5D coordinates $(X,Y,Z,\theta,\phi)$. Meaning that the function $F_\theta$ will be called seven times. However, in reality, this is not 7 but many evaluations (e.g., 100-200 evaluations) that needs to be performed and hence, view synthesis through NeRF is very costly and time consuming. Each function call will give RGB color along with transmittance at specific position or point 104 on the ray 102. These RGB color and transmittance values will be combined for the seven sample points to generate a final color for a particular pixel for which the ray is cast.

A neural radiance field represents the appearance and geometry of a scene with an MLP $F\theta: (x_t, \vec{\omega}) \to (L_e(x_t, \vec{\omega}), \sigma(x_t))$ with trainable weights $\theta$. It takes as input a 3D position $x_t$ and a viewing direction $\vec{\omega}$, and produces both the density $\sigma(x_t)$ at point $x_t$ and the radiance $L_e(x_t, \vec{\omega})$ emitted at point $x_t$ in direction $\vec{\omega}$. One can generate views of the scene from this MLP using volume rendering:

$$L(x, \vec{\omega}) = \int_{t_n}^{t_f} \underbrace{T(x, x_t)}_{Acc.transmittance} \underbrace{\sigma(x_t)}_{Density} \underbrace{L_e(x_t, \vec{\omega})}_{Emitted\ radiance} dt, \quad (1)$$

where $$T(x, x_t) = e^{-\int_{t_n}^{t} \sigma(x_s) ds}$$

describes the accumulated transmittance for light propagating from position x to $x_t$, for near and far bounds $t \in /t_n$, tf/of the scene. In practice, one may approximate the integral using numerical quadrature:

$$L(x, \vec{\omega}) \approx \sum_{k=1}^{N} \hat{T}(x, xk)(1 - e^{-\sigma(x_k)\Delta x_k}) L_e(x_k, \vec{\omega}), \quad (2)$$

k=1 where $\hat{T}(x, x_k) = e^{-\Sigma_{kj=1} a(xj)\Delta xj}$ and $\Delta x_j = x_j - xj-1$ is the distance between adjacent samples. An accurate approximation of (1) requires many samples and thus many neural network evaluations (e.g., on the order of hundreds) per ray.

As discussed, one problem with performing view synthesis via NeRF is that volume rendering requires many samples and thus many neural network evaluations per ray to accurately approximate a volume rendering integral. Thus, rendering from a NeRF is usually quite slow. Another problem with NeRF is the way the neural network is constructed, due to which it limits the amount of view dependency that the NeRF may represent. Because of this, NeRF may be not be able to efficiently and effectively represent light matter interactions, for example, as shown in FIGS. 9A-9C. By way of an example, consider a scene containing a crystal ball as shown in FIG. 9A. When light passes through the crystal ball and it reflects inside, it is a difficult phenomenon to represent. NeRF does not have the capability to represent this kind of complex light matter interactions, such as light reflections and/or refractions.

Particular embodiments discussed herein relates to a neural light field representation for view synthesis that tackles or overcomes at least the above-discussed issues/limitations of existing NeRF (i.e., NeRF requiring many network evaluations per pixel and its incapability to represent complex light matter interaction). The neural light field representation is now discussed in detail below.

Neural Light Fields

Figure 2:
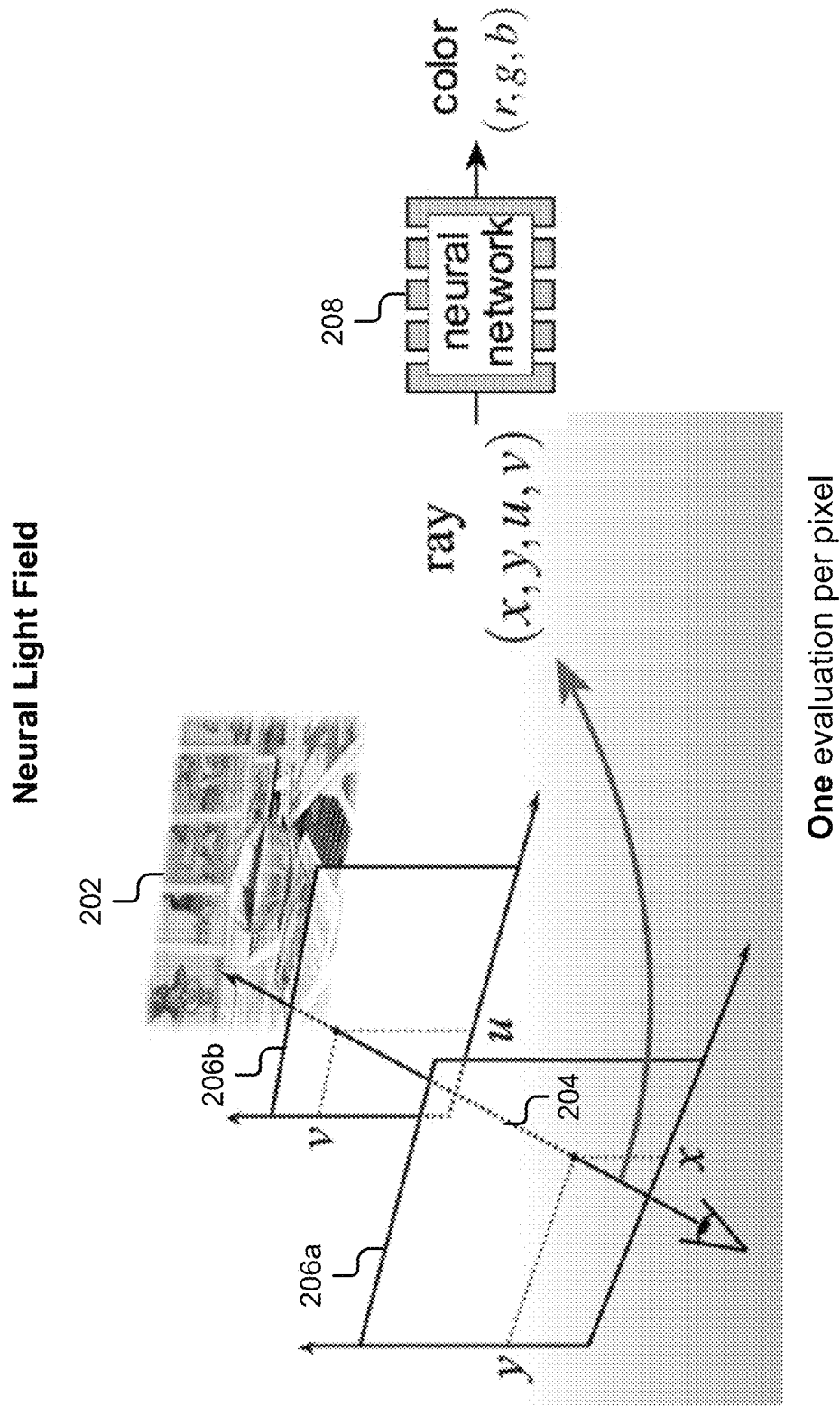
FIG. 2 illustrates an example rendering for view synthesis of a scene using a neural light field representation.

A light field is an integral of a radiance field. It maps ray parameters directly to the integrated radiance along that ray. A common assumption for light fields is that this integral remains the same no matter the ray origin (i.e., radiance is constant along rays), which holds when the convex hull of all camera positions for training and view synthesis does not contain any scene geometry. Given this assumption, a light field is a function of a ray on a four-dimensional (4D) ray space, for example, as shown in FIG. 2. Thus, only one look-up of the underlying representation is required to determine the color of a ray, hence one evaluation per pixel unlike hundreds of evaluations required by a NeRF.

FIG. 2 illustrates an example rendering for view synthesis of a scene using a neural light field representation. Whereas a neural radiance field (NeRF) represents the radiance emitted at each point in space (e.g., as depicted by ray 102 in FIG. 1), a light field represents the total integrated radiance traveling along a ray, such as ray 204. Therefore, light field does not require numerical integration for rendering. In other words, Equations (1) and (2) above describe the relationship between the light field L and the radiance field $(L_e, a)$. By optimizing a neural light field representation for L, given an input ray (e.g., ray 204), one can predict this integrated radiance (and therefore render the color along this ray) with only a single neural network evaluation.

As depicted in FIG. 2, to render a scene 202 from a novel pose or view, a ray 204 is cast or shoot into the 3D space. Here the ray 204 is parameterized with 4D coordinates (x,y,u,v) using two planes 206a and 206b instead of 5D coordinates $(X,Y,Z,\theta,\phi)$, as was the case in NeRF. Assuming that the underlying system is operating on forward facing scenes, and that radiance remains constant along rays, one may construct a 4D ray space by intersecting rays with two planes, $\pi^{xy}$ and $\pi^{uv}$. One may then take the local planar coordinates, $(x,y) \in \pi^x y$ and $(u, v) \in \pi^{uv}$ of these ray intersections as the ray parameterization for the 4D light field, $L:r=(x,y,u,v) \to c=(r,g,b)$. Specifically, to render a color for a pixel, the ray 204 is cast and 4D ray coordinates (x,y,u,v) are provided as inputs to a compact neural light field network 208, which is trained to produce a color (r,g,b) for the pixel in just one evaluation per pixel. This is in contrast to hundreds of network evaluations, which was required by NeRF, as discussed above in reference to FIG. 1. Additionally, because the neural light fields are geometry free, they may better represent complex view dependences (e.g., better represent light reflections and refractions) than volume-based approaches, such as NeRF.

However, training or learning a neural light field is not as easy as it may seem. A light field network may be trained to produce color for an image using different configurations. Three specific configurations for training the neural light fields are discussed herein in reference to FIGS. 3A-3C. Each of these configurations is discussed in detail below.

Baseline Neural Light Fields

FIG. 3A illustrates a first example configuration 300 for training a neural light field network for view synthesis. The configuration 300 is also referred to herein as baseline configuration, which does not involve ray-spacing embedding (discussed later below). Similar to how NeRF uses an MLP to represent radiance fields, an MLP $F_\theta$ 310 may be defined to represent a light field. As depicted in FIG. 3A, a ray 302 is first parameterized with 4D ray coordinates (e.g., using two planes as discussed above in FIG. 2) and a positional encoding 304 is applied on the 4D ray coordinates. The light field network $F_\theta$ 306 then takes as input positionally encoded 4D ray coordinates $\gamma(r)$ and outputs color c (integrated radiance) 308 along each ray. This may be represented by:

$$L_{base}(r) = F_\theta(\gamma(r)). \quad (3)$$

This baseline approach, however, is an unsatisfactory light field representation due to the following challenges. First, the captured input images only provide partial observations in the form of a sparse set of 2D slices of the full 4D ray space, so that each 4D ray coordinate in the input training data is observed at most once. Because of this, the network may require many more training iterations to "memorize" the input. Second, light fields do not explicitly represent 3D scene geometry; hence the network a priori does not know how to interpolate the colors of unobserved rays from training observations. In other words, when querying a neural network representing a light field with unseen ray coordinates, multi-view consistency is not guaranteed. To address these challenges, three key techniques are presented in this disclosure, including ray-space embedding networks, subdivision of light fields, and student-teacher regularization for training neural light field, each of which substantially improves the rendering quality of the proposed neural light field representation.

Neural Light Fields with Ray-Space Embedding Network

FIG. 3B illustrates a second example configuration 310 for training a neural light field network for view synthesis with a ray-space embedding network. The ray-space embedding network re-maps the input ray-space into an embedded latent space. Intuitively, the goals for ray-space embedding networks are memorization and interpolation. Memorization maps disparate coordinates in input 4D ray-space that observe the same 3D point to the same location in the latent space. This allows for more stable training and better allocation of network capacity, and thus better memorization of input views. Interpolation produces an interpolable latent space, such that querying unobserved rays preserves multi-view consistency and improves view synthesis quality.

As depicted in FIG. 3B, 4D ray coordinates associated with a ray 312 are first nonlinearly mapped to an embedding network 314 (or a latent feature space) via an MLP, $E_\phi^{feat}$: $r \to f \in R^N$, where N is the feature space dimension. This embedding network 314 may produce a nonlinear, many-to-one mapping from distinct ray coordinates into shared latent features, which would allow for better allocation of capacity to the downstream light field network $F_\theta$ 318. The finite capacity of $F_\theta$ incentivizes this "compression" and thus encourages rays with similar colors to be mapped to nearby features in the latent space (e.g., effectively a form of implicit triangulation). After embedding, positional encoding 316 is applied to the N-dimensional feature produced by the embedding network 314 and then the positionally encoded N-dimensional feature is feed into the light field MLP $F_\theta$ 318, which produces a color 320 for a pixel, as follows:

$$L_{feat}(r) = F_\theta(\gamma(E_\phi^{feat}(r))). \quad (4)$$

The color 320 may be compared with a ground-truth or true color associated with a pixel for which the color 320 is produced. Based on the comparison, the embedding network 314 and the light field network 318 may be updated. The updated embedding network 314 and light field network 318 may then be used to produce a color for a next pixel in a next iteration, and this training process may be repeated until the embedding network 314 and the light field network 318 are deemed to be sufficiently complete (e.g., reached to a level where the light field network 318 is able to produce a color same or similar to the true color). While this approach (i.e., feature-based embedding illustrated in FIG. 3B) compresses and helps to find correspondences in ray space, it is not enough to facilitate the interpolation between these correspondences. This is resolved via a local affine transformation-based embedding, as shown and discussed below in reference to FIG. 3C.

Neural Light Fields with Local Affine Transformation-Based Embedding

FIG. 3C illustrates a third example configuration 330 for training a neural light field network for view synthesis with a local affine transformation-based embedding. At a high level, the goal or aim of the local affine transformation-based embedding is to learn affine transforms for each location or coordinate in ray space, such that the ray space is axis-aligned (e.g., as shown in FIG. 4A) from an ill-parameterized ray space (e.g., as shown in FIG. 4B). These affine transforms may be used to locally re-parameterize the input rays. These re-parameterized rays are then positionally encoded and fed into downstream light field network that predicts color.

Figure 5:
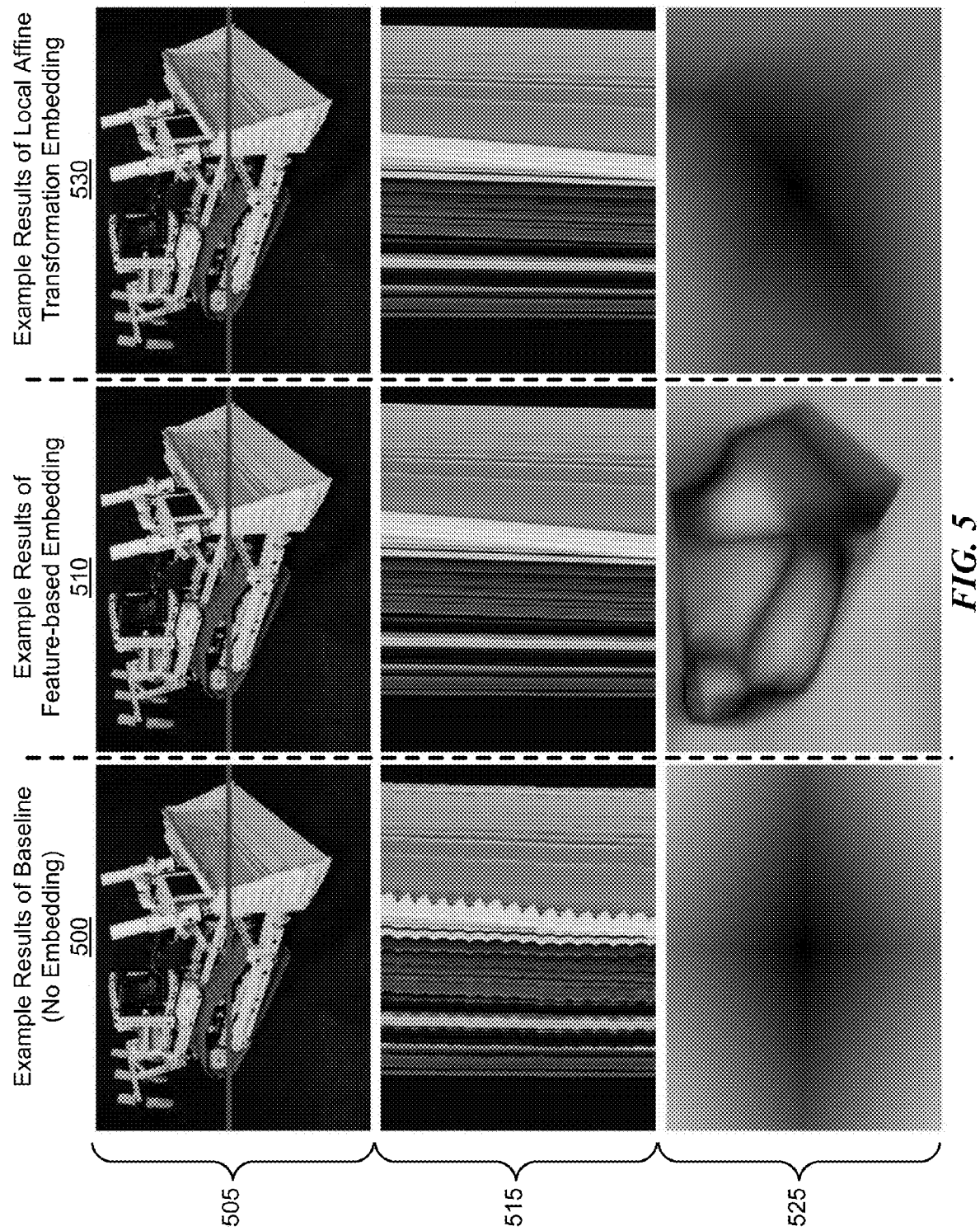
FIG. 5 illustrates example results of different neural light field configurations.

The concept of local affine transformation and why it is needed is now discussed with respect to FIGS. 4A-4B. FIG. 4A illustrates an example axis-aligned ray space. In particular, FIG. 4A represents a scene containing an axis-aligned textured square 402 at a fixed z-depth. Again, a two-plane parameterization (i.e., parameterizing a ray with two planes 404a and 404b) is assumed for the input ray-space of this scene. If one of the planes, such as plane 404b, is at the depth of the square 402, then the light field will only vary in two coordinates, as illustrated in FIG. 4A. In other words, the light field is only a function of (u, v) and is constant in (x, y). Since positional encoding is applied separately for each input coordinate, the baseline model (e.g., as shown in FIG. 3A) may interpolate the light field perfectly if it chooses to ignore the positionally encoded coordinates (x, y). FIG. 4B illustrates an example non-axis-aligned ray space or an ill-parameterized ray space. This occurs when the two planes, such as planes 414a and 414b, in the parameterization do not align with the textured square 402. Due to this, the color level sets of the light field are 2D affine subspaces, denoted by g(s,t), that are not axis-aligned, as shown in FIG. 4B. Intuitively, the positional encoding of g will vary in a highly non-linear way along the 2D s–t parameter space, producing a much more complex level set than in the axis-aligned case (e.g., as shown in FIG. 4A). It is then more difficult, and requires more network capacity, to learn to map γ(g(s,t)) to a single color. One can therefore frame the task of effective interpolation as learning an optimal re-parameterization of the light field, such that the 2D color level sets for each 3D scene point are axis-aligned (e.g., as shown in FIG. 4A). Assuming that the re-parameterization is locally smooth (e.g., ideally constant along the 2D affine subspace corresponding to a 3D point), it will enable good interpolation, as shown in FIG. 5. Therefore, local affine transformation is needed to re-parameterize the input ray or input ray coordinates, which essentially transforms a non-axis-aligned ray space (e.g., FIG. 4B) to an axis-aligned ray space (e.g., FIG. 4A). Re-parametrization of the input ray or input ray coordinates is also needed because of the fact that it is easy to learn a light field for a well-parameterized ray-space, but a ray-space with non-axis-aligned level sets makes the problem more challenging, especially when using Fourier features.

Returning back to FIG. 3C, an embedding network 334 is trained to learn and output local affine transformations for each coordinate in ray space. Here local affine transformations are learned rather than a single global transformation because different rays may correspond to points with different depths, which will cause the color level sets at these locations to vary. To this end, an MLP $E\varphi: r \rightarrow (A \in R^{N \times 4}, b \in R^N)$ is employed. The output of the embedding network 334 is a N×4 matrix A, as well as an N-vector b representing a bias (translation), which together form a 4D→ND affine transformation. This affine transformation is applied by the embedding network 334 to the input ray coordinate r 332. As discussed elsewhere herein, the local affine transformation transforms the input ray coordinate from first ray coordinates to second ray coordinates, such that the ray space is axis-aligned, as shown and discussed in reference to FIG. 4A. In particular embodiments, transforming the input ray coordinate may include re-parameterizing the input ray 332. A positional encoding 336 is then applied to the re-parameterized or transformed ray coordinates. The positionally encoded ray coordinates are then passed into the light field network $F_\theta$ 338 to produce a color 340 for the ray, as follows:

$$L(r) = F_\theta(\gamma(Ar + b)), \text{ where } (A, b) = E_\phi(r). \tag{5}$$

The color 340 may be compared with a ground-truth or true color associated with a pixel for which the color 340 is produced. Based on the comparison, the embedding network 334 and the light field network 338 may be updated. The updated embedding network 334 and light field network 338 may then be used to produce a color for a next pixel in a next iteration, and this training process may be repeated until the embedding network 334 and the light field network 338 are deemed to be sufficiently complete (e.g., reached to a level where the light field network 338 is able to produce a color same or similar to the true color).

FIG. 5 illustrates example results 500, 510, and 530 of different neural light field configurations 300, 310, and 330, respectively. Here the top row 505 shows predicted images, middle row 515 shows predicted EPIs, and bottom row 525 shows a visualization of the embedding space for each configuration 300, 310, and 330. The model without an embedding network (i.e., baseline configuration 300) predicts images with distortions, and interpolates poorly, as depicted by the results 500. The feature embedding network (i.e., second configuration 310 with ray-space embedding network) learns a salient latent space that registers disparate rays. It interpolates views fairly well, but color level sets corresponding to a point are not always planar, which leads to decreased overall quality, as depicted by the results 510.

By comparing the results 500 and 510, it may be observed that the use of the feature-based embedding (e.g., as shown and discussed in second configuration 310) leads to a boost in quality over the baseline (e.g., as shown and discussed in first configuration 300). In particular, the feature-based embedding achieves the first objective of embedding ("memorization"). Indeed, the embedding network (e.g., embedding network 314) finds correspondences between input ray-space coordinates that observe the same scene points. However, it may still struggle to interpolate these correspondences appropriately in between views, i.e., while identifying rays mapping to the same point, it does not necessarily know which intermediate unobserved rays map to that same point.

The local affine transformation embedding (i.e., third configuration 330 with local affine transformation-based embedding) learns a smooth set of affine transformations, yielding an embedding space that enables both high quality prediction and good interpolation, as depicted by the results 530. The local affine transformation embedding allows the network to achieve better interpolation quality. Because the embedding network (e.g., embedding network 334) that predicts affine transformations does not use positional encoding, the predicted transformations vary smoothly. Thus, level sets in the embedding space are already close to locally planar, and a model is learned that interpolates in a (locally) view consistent way for free. It has been observed that the difference in quality between feature and local affine embedding is far more obvious in video comparisons.

Figure 6:
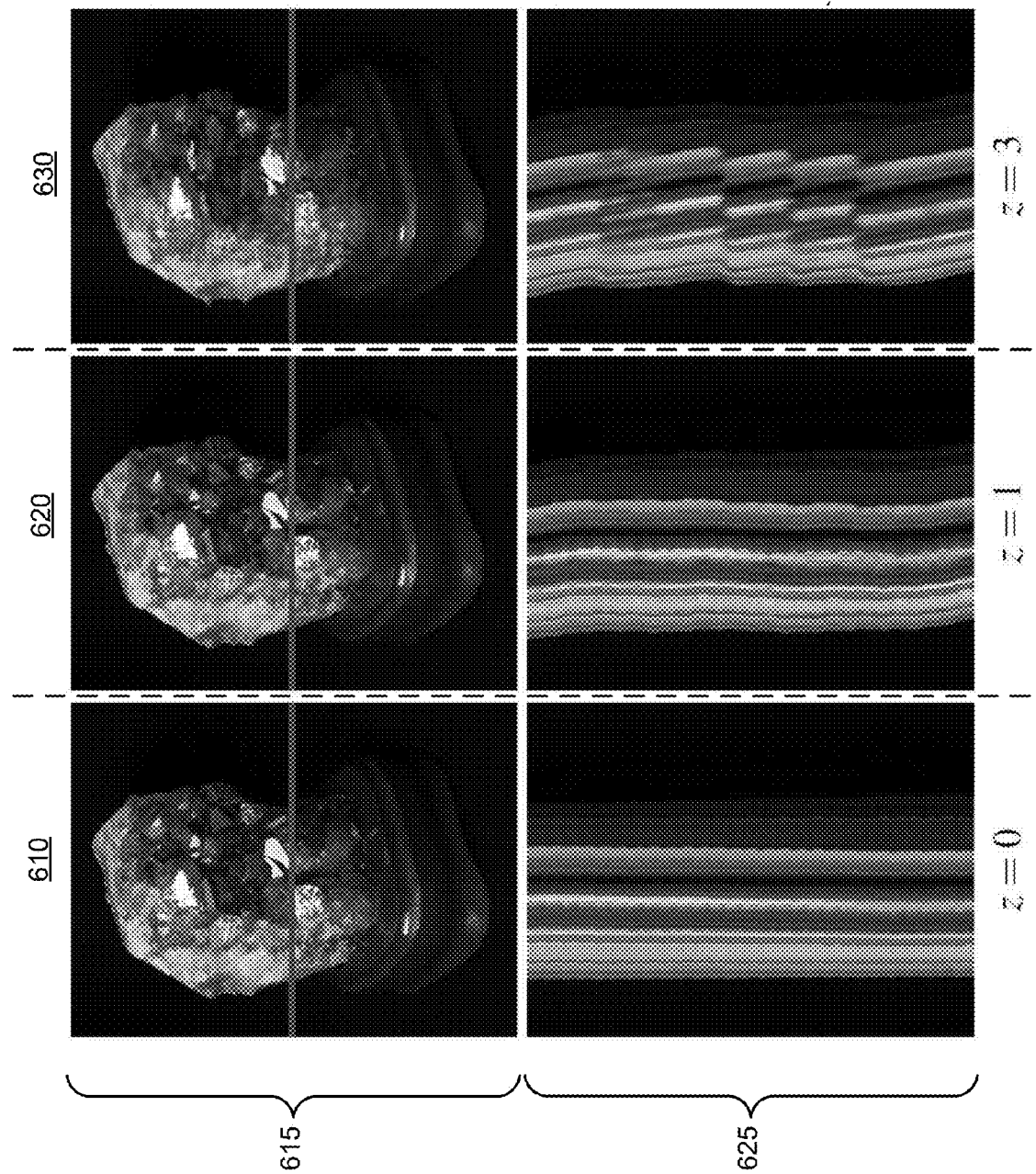
FIG. 6 illustrates example results with different ray parameterizations.

FIG. 6 illustrates example results with different ray parameterizations. Light field parameterization is crucial for enabling good view interpolation. As discussed elsewhere herein, a ray may be parameterized using two planes, such as, for example, planes 404a, 404b (e.g., as shown in FIG. 4A) or planes 414a, 414b (e.g., as shown in FIG. 4B). In particular embodiments, the two planes in the initial two plane parameterization may be represented as $\pi^{xy}$ and $\pi^{uv}$, with local coordinates (x, y) and (u, v). Here the top row 615 shows predicted images and the bottom row 625 shows predicted EPIs. The results 610 represent a first case when one of the planes ($\pi^{uv}$) is at the object plane at z=0 (i.e., one of the planes is at the depth of an axis-aligned textured square of a scene), such as the axis-aligned ray space shown and discussed in FIG. 4A. The results 620 represent a second case when one of the planes ($\pi^{uv}$) is located or moved further away from the object plane at z=1. The results 630 represent a third case when one of the planes ($\pi^{uv}$) is located or moved even further away from the object plane at z=3. As can be observed from these results 610-630, reconstruction becomes progressively worse for a worse initial parameterization (e.g., $\pi^{uv}$ moving further and further from the object plane at z=0).

Subdivided Neural Light Fields

In particular embodiments, including embedding networks (e.g., embedding network 314 or 334) in a neural light field architecture meets the state-of-the-art view synthesis for dense input sequences or small-baseline input sequences (e.g., such as those obtained from Stanford light field dataset). Stated differently, the embedding network discussed herein may effectively find correspondences between input rays when the training data used is a dense training dataset. The dense training dataset may be obtained when a large number of training images associated with a scene tries to capture the scene from all possible camera angles (i.e., images are captured with camera viewpoints or positions that may be located close to each other). However, the embedding (e.g., feature-based embedding or the local affine transformation-based embedding) may not work well for sparse training dataset or large-baseline input sequences (e.g., such as those obtained from NeRF's real forward-facing dataset). The sparse training dataset may include a fewer number of images associated with a scene and these images may capture the scene with camera viewpoints or positions that may be located far away from each other.

Figure 7:
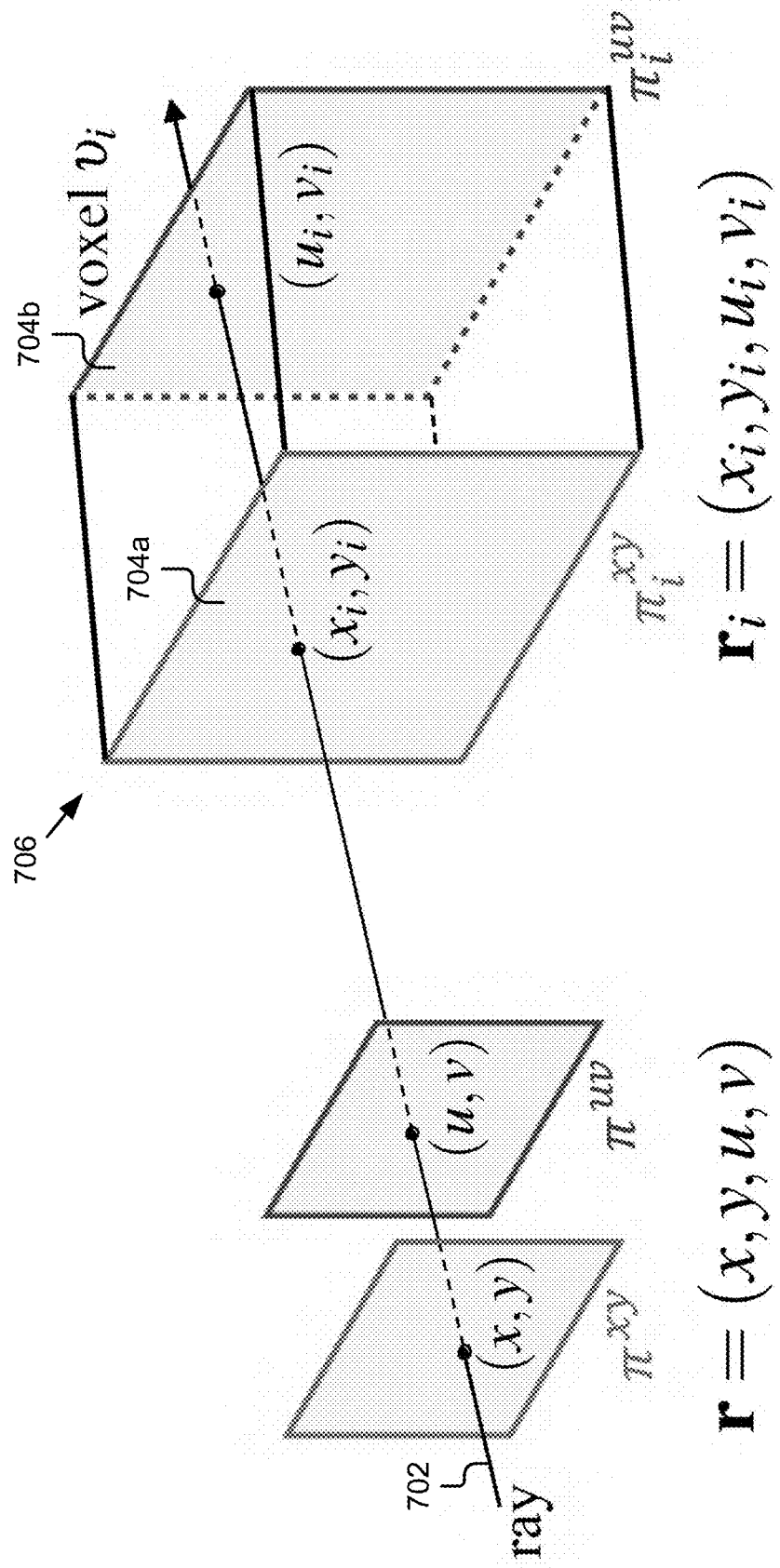
FIG. 7 illustrates re-parameterization of a ray for local light fields.

When the training data samples the input ray-space too sparsely (e.g., the training data is a sparse training dataset), the embedding network (e.g., embedding network 314 or 334) struggles to find long-range correspondences between training rays. Moreover, even if it can discover correspondences, interpolation for unobserved rays in between these correspondences remains underconstrained. To resolve these issues, particular embodiments describe learning a voxel grid of local light fields (also interchangeably referred to herein as sub light fields). This approach is motivated by the following observation: if a local light field is parameterized for a voxel by intersecting rays with the voxel's front and back planes (e.g., as shown in FIG. 7), the color level sets of the local light field are already almost axis-aligned. As such, the ray-space embedding for each voxel may be simple, only inducing small shears of the input ray-space in order to allow for good interpolation. On the other hand, a global light field requires learning a complex ray-space embedding that captures occlusions and large depth changes.

FIG. 7 illustrates re-parameterization of a ray for local light fields. Here a ray 702 represented as r=(x, y, u, v) and defined globally is re-parameterized with respect to each local light field in voxel $v_i$, by intersecting the ray 702 with a front plane 704a and a back plane 704b of the voxel $v_i$ 706. This yields local ray coordinates $r_i=(x_i, y_i, u_i, v_i)$ for one of the local light fields in a particular voxel. This same procedure may be repeated to parameterize rays for other local or sub light fields by intersecting the ray 702 with other voxels in the voxel grid to yield local ray coordinates for the other local light fields. For instance, if the 3D space is subdivided into M voxels, there exist M distinct but equivalent parameterizations $\{r_i\}_{i=1}^{M}$ of each ray r.

A local light field may be learned much more easily than a full global light field with the same training data. This still requires an assignment problem to be solved. For instance, one must know which rays to use to train each local light field. While one may easily exclude all rays that do not intersect the voxel containing the local light field, still many other rays may be occluded by other geometry before they hit the voxel. These rays should also be excluded during training. A simple way to handle ray-assignment is by learning opacity. If the opacity accumulated along a ray before it hits a voxel is high, this ray should receive little contribution from this voxel, and contributes little to this voxel's gradient during training; and similarly, if the opacity accumulated along a ray within the voxel is small. Therefore, the local light field network may be modified to also produce integrated opacity, or alpha. This is further shown and discussed below in reference to FIG. 8.

Figure 8:
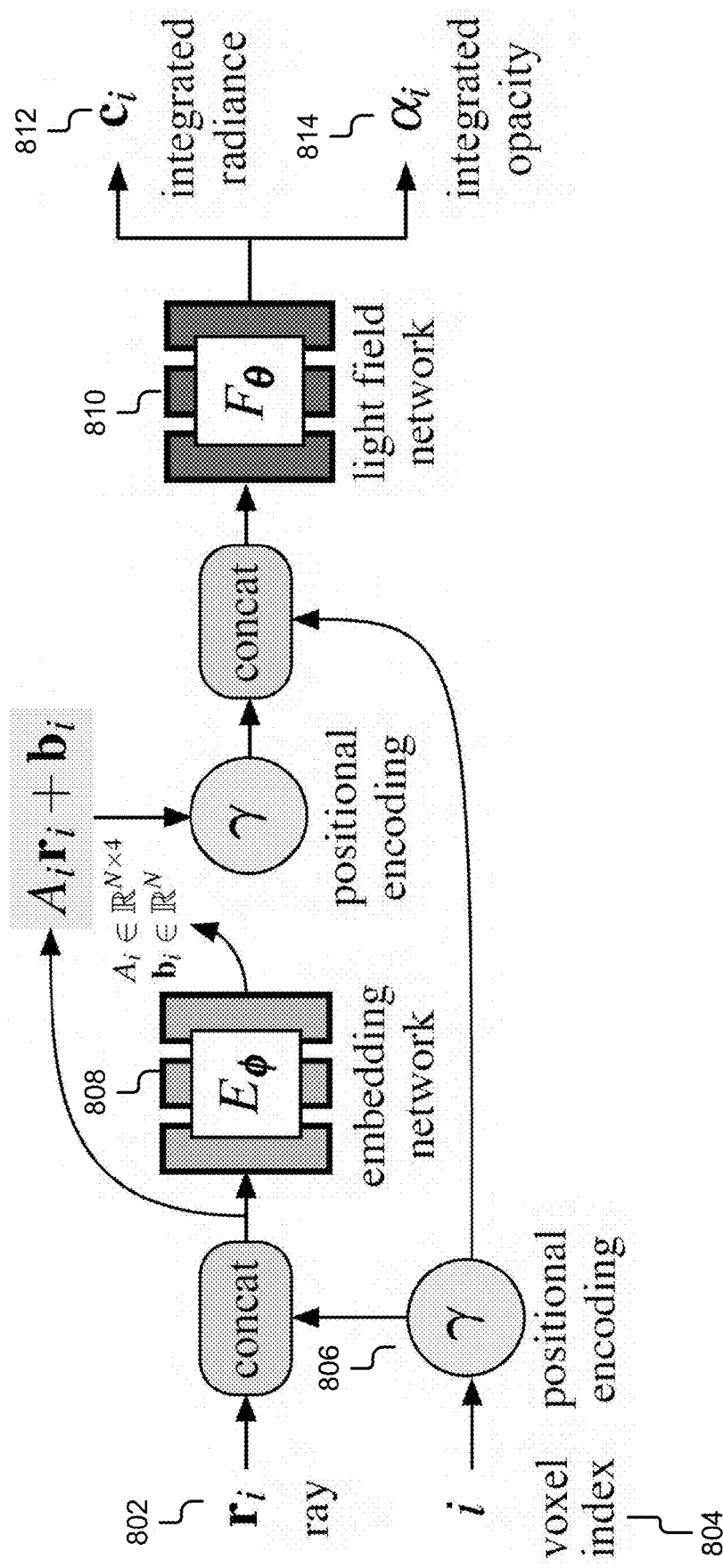
FIG. 8 illustrates an example subdivided volume rendering method for view synthesis of sparse training dataset or large-baseline input sequences.

FIG. 8 illustrates an example subdivided volume rendering method for view synthesis of sparse training dataset or large-baseline input sequences. In particular, FIG. 8 shows how a set local light fields represent a scene and how they may be rendered to form new images. Given a voxel grid in 3D space, the light field within each voxel may be parameterized with respect to the voxel's front and back planes (e.g., as shown and discussed in FIG. 7), yielding the ray coordinates $r_i$, where i is some voxel index, for any ray r defined globally. If the 3D space is subdivided into M voxels, there exist M distinct but equivalent parameterizations $\{r_i\}_{i=1}^{M}$ of each ray r. At a high level, to render a color using the subdivided volume rendering method of FIG. 8, each local light field takes a locally re-parameterized ray $r_i$ (indicated by reference numeral 802) and its voxel index i (indicated by reference numeral 804) and predicts both an integrated radiance 812 and an integrated opacity 814 for the ray segment traveling through the voxel. Both the embedding network Eφ (indicated by reference numeral 808) and the light field network $F_θ$ (indicated by reference numeral 810) are conditioned on positionally encoded voxel index γ(i) (i.e., resulting voxel index after positional encoding 806). The integrated radiance 812 and integrated opacity 814 generated for each local light field may be combined together to generate a final color of ray r. This is further discussed in detail below.

To implement the model depicted in FIG. 8, the embedding network Eφ (indicated by reference numeral 808) is augmented such that it takes the positionally encoded voxel index γ(i) (i.e., resulting voxel index after applying positional encoding 806) in addition to the 4D ray coordinates associated with the locally re-parameterized ray $r_i$ (indicated by reference numeral 802), i.e., Eφ:$(r_i,γ(i))→(A_i,b_i)$. The light field network $F_θ$ (indicated by reference numeral 810) is augmented in the same way, and also predicts both color and alpha, as follows: $F_θ:(γ(A_ir_i+b_i),γ(i))→(c_i,α_i)$, where $α_i$ is integrated opacity 814 within the voxel $v_i$, just as $c_i$ is the integrated radiance 812 therein.

Given this model, rendering works in the following way. First, a set of voxels V(r) that the ray r intersects are identified. Each voxel may contain a local light field or a sub light field, where each local light field may be associated with a distinct ray space embedding network. The ray is then intersected with the voxel's front and back planes $π_i^{xy}$ and $π_i^{uv}$, as shown and discussed in reference to FIG. 7. This process yields a series of local ray coordinates $\{r_i\} \forall i \in V(r)$. The color $c_i$ and alpha $a_i$ of each $r_i$ are then computed as:

$$(c_i, α_i) = F_θ(γ(A_ir_i + b_i), γ(i)) \quad (6)$$

where the local affine-transformation is obtained from the embedding network 808 as follows:

$$(A_i, b_i) = E_φ(r_i, γ(i)). \quad (7)$$

The final color of ray r is then over-composited from back to front as follows:

$$c = \sum_{i \in V(r)} \left( \prod_{j \in V(r) \wedge j < i} (1 - a_j) \right) a_i c_i \quad (8)$$

which assumes the voxel indices are sorted by the distances from the ray origin in descending order.

Student-Teacher Regularization for Training Neural Light Fields

In some embodiments, training of the neural light field network discussed herein may optionally be regularized or supervised with additional teacher signals using trained NeRFs. This may help bootstrap the training process. Such a regularization process for training the neural light fields may be referred to as a student-teacher regularization, where a neural light field undergoing the training is the student and a trained NeRF used for the training is the teacher. Training with this additional signal may be eased out gradually (i.e., using the trained NeRF in the training of the neural light field may be gradually reduced or decreased over time). By way of an example and without limitation, in this student-teacher regularization, a 10×10 grid of images may be rendered from a trained NeRF and included in the training set for training a neural light field. Teacher influence may be gradually decreased throughout training by decaying the loss for the predicted images by a factor of 0.25 every 500 epochs (e.g., training iterations). In some embodiments, training a neural light field using this student-teacher regularization leads to improved multi-view consistency and better numerical performance than the teacher (e.g., trained NeRF), with slightly worse reproduction of view dependence the model trained without this regularization.

In some embodiments, training a neural light field or supervising/regularizing the training of the neural light field using a trained NeRF may be performed in two ways. As a first way, output images generated or rendered by the trained NeRF may be used as training images for training the neural light field network. As a second or alternate way, the output images generated by the trained NeRF may be used as ground-truth images for comparing predicted color values generated by the neural light field network with true color values associated with the ground-truth images. Other ways of regularizing the training of the neural light field using the trained NeRF are also possible and within the scope of the present disclosure.

Example Results

FIG. 9A-9C illustrate example comparisons between outputs generated by a neural light field discussed herein and existing NeRF. Specifically, FIG. 9A illustrates a first example comparison 900 based on an output 902 generated by the neural light field and an output 904 generated by the neural radiance field, which was the previous or existing state-of-the-art technique for view synthesis. As discussed elsewhere herein and can be seen from this comparison 900, the neural light field reconstructs view dependence better than the NeRF. This is especially prominent with high-frequency view-dependent effects, such as reflection and refraction. For instance, light reflections 912 and 914 are better shown on the crystal ball 910 in the output 902 than the output 904. Also, the overall content on the crystal ball 910 in general is sharper in the output 902 than the output 904. FIG. 9B illustrates a second example comparison 920 based on an output 922 generated by the neural light field and an output 924 generated by the neural radiance field. Here also, it may be observed that the light reflections and/or refractions 926 are better represented in the output 922 generated by the neural light field than the output 924 generated by the NeRF. FIG. 9C illustrates a third example comparison 930 based on an output 932 generated by the neural light field and an output 934 generated by the neural radiance field. Again, it may be observed from portion 936 in each these outputs 932 and 934 that better sharpness and better reproduced view-dependent effects (e.g., light reflections, refractions) are represented by the neural light field than NeRF, and that too requiring far fewer network evaluations per pixel.

Example Method

Figure 10:
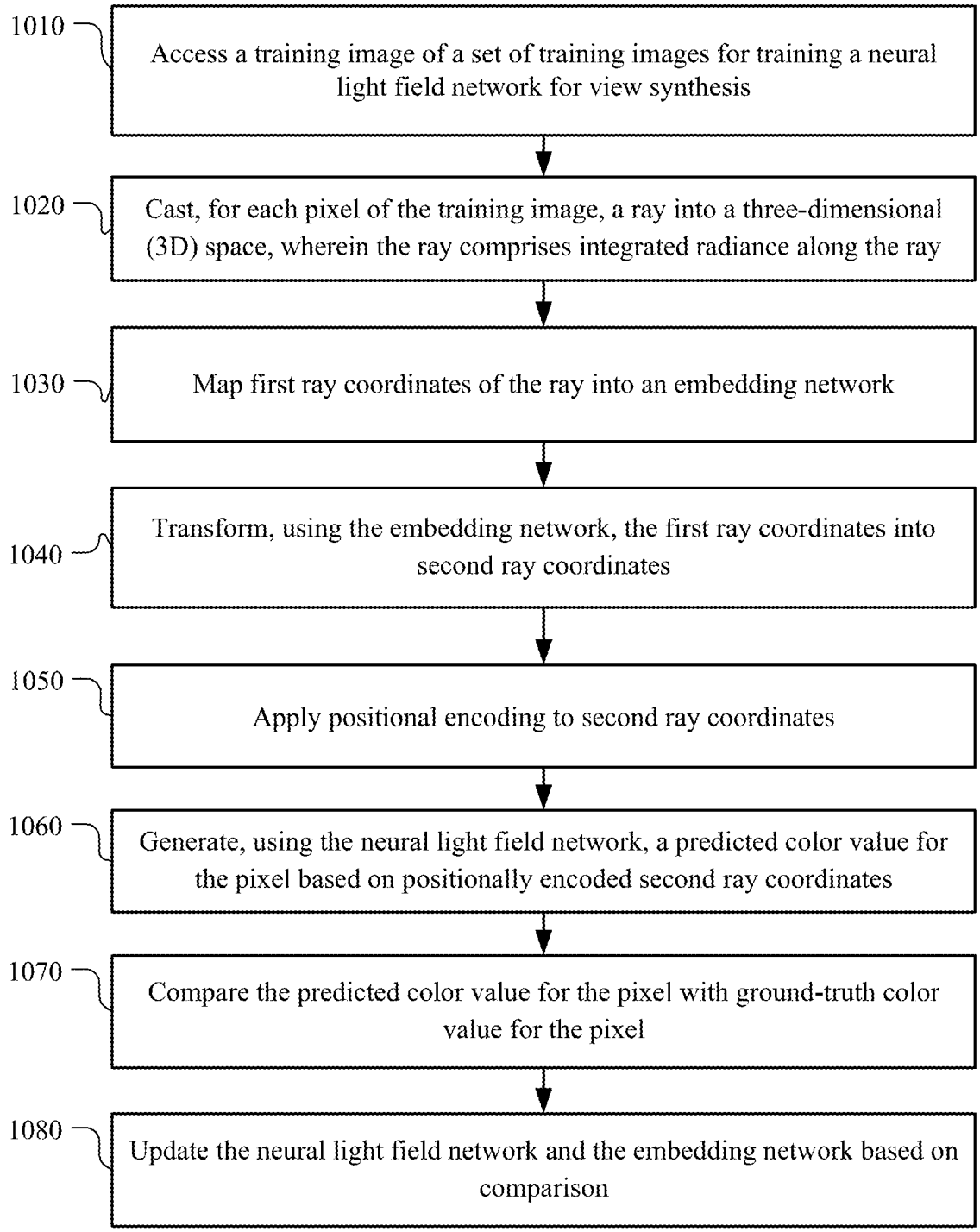
FIG. 10 illustrates an example method for training a neural light field network for view synthesis, in accordance with particular embodiments.

FIG. 10 illustrates an example method 1000 for training a neural light field network for view synthesis, in accordance with particular embodiments. Specifically, the method 1000 illustrates steps performed based on the local affine transformation-based embedding as discussed in reference to FIG. 3C. The method 1000 illustrates steps (e.g., steps 1010-1080) performed by a computing system (e.g., computing system 1100) during a single or one training iteration. Although the training process in the method 1000 is discussed with respect to a single image, it should be noted that the training is not limited to the single image and a plurality of images may be accessed and used for training the neural light field network, as discussed elsewhere herein. For instance, steps 1010-1080 may be repeated for several iterations until the neural light field network is deemed to be sufficiently complete.

The method 1000 may begin at step 1010, where a computing system (e.g., computing system 1100) may access a training image of a set of training images for training a neural light field network for view synthesis (or novel view synthesis). The neural light field network may be a neural network or a multi-layer perceptron (MLP). The set of training images may be a dense training dataset, such as the Stanford light field dataset. The dense training dataset (or small-baseline input sequences) may be obtained by capturing relatively a large number of training images with camera viewpoints, positions, or angles located close to each other. In particular embodiments, when a dense training dataset is used for the training, the neural light field network discussed herein may be trained based on the feature-based embedding (e.g., as shown and discussed in reference to FIG. 3B) or the local affine transformation-based embedding (e.g., as shown and discussed in reference to FIG. 3C). In some embodiments, the set of training images may be a sparse training dataset, such as real forward-facing dataset. The sparse training dataset (or large-baseline input sequences) may be obtained by capturing relatively a fewer number of training images with camera viewpoints, positions, or angles located distant apart or far away from each other. In particular embodiments, when a sparse training dataset is used for the training, the neural light field network discussed herein may be trained based on a spatial subdivision or subdivided volume rendering method discussed in reference to FIG. 8.

At step 1020, the computing system (e.g., computing system 1100) may cast or shoot, for each pixel of the training image, a ray into a three-dimensional (3D) space. The ray may include integrated radiance along the ray, as discussed elsewhere herein. In particular embodiments, the ray is a 4D ray including 4D light field coordinates (x,y,u,v). The ray may be parameterized with two planes, where a first plane may be located at a certain distance and/or position from a second plane, as shown and discussed in reference to at least FIG. 2.

At step 1030, the computing system (e.g., computing system 1100) may map first ray coordinates of the ray into an embedding network, such as the embedding network 334. In particular embodiments, the embedding network is a latent space for representing correspondences between rays associated with pixels of the training image. For instance, the embedding network maps ray coordinates with a similar color in a close area in the latent space. By way of an example, if two rays are seeing the same 3D point, then coordinates of these two rays will likely be mapped into some area that is very close to each other, and this will lead to similar colors in the final output.

At step 1040, the computing system (e.g., computing system 1100) may transform, using the embedding network (e.g., embedding network 334), the first ray coordinates into second ray coordinates. By way of an example and without limitation, a ray r with coordinates (x, y, u, v) may be transformed or re-parameterized to a ray ri with coordinates ($x_i$, $y_i$, $u_i$, $v_i$), as shown and discussed in reference to FIG. 7. In particular embodiments, transforming the first ray coordinates into the second ray coordinates may include transforming a non-axis-aligned ray space or an ill-parameterized ray space (e.g., as shown in FIG. 4B) into an axis-aligned ray space (e.g., as shown in FIG. 4A). In particular embodiments, transforming the first ray coordinates into the second ray coordinates may include local affine transformation of the ray, as discussed elsewhere herein. In some embodiments, the local affine transformation of the ray may divide the ray into a plurality of sub rays. For instance, as shown in FIG. 3C, the embedding network 334 outputs a N×4 matrix. Assuming here N is like multiple of 4. So if we use 32, you estimate 8 affine transformations, which will transform a single ray into 8 of them (e.g., 8 sub rays). Then you use all of them to query the light field network (e.g., light field network 338), and the light field network may be trained such that it is capable to pick up the best affine transformation or potentially multiple of them to best represent a scene.

At step 1050, the computing system (e.g., computing system 1100) may apply a positional encoding to transformed ray coordinates or second ray coordinates obtained after the local affine transformation. In some embodiments, positional encoding is a way to represent the dimensionality of the input so that the subsequent network becomes capable of keeping high frequency details. Without positional encoding, the neural network may not represent sharp features in the scene, such as sharp discontinuity or color changes and so on. That's why positional encoding is needed before feeding the ray coordinates to the neural light field network.

At step 1060, the computing system (e.g., computing system 1100) may generate, using the neural light field network (e.g., light field network 338), a predicted color value for the pixel based on positionally encoded second ray coordinates. In particular embodiments, the predicted color value for the pixel may be generated based on one evaluation of the neural field network instead of hundreds of network evaluations as required by NeRF, as discussed elsewhere herein. At step 1070, the computing system (e.g., computing system 1100) may compare the predicted color value for the pixel with a ground-truth color value for the pixel. In some embodiments, the ground-truth color value may be provided by a trained NeRF, as discussed elsewhere herein.

At step 1080, the computing system (e.g., computing system 1100) may update the neural light field network and the embedding network based on comparison. The updated neural light field network and the embedding network may then be tested for a second image in a set of training images or for a next iteration. The training process (e.g., steps 1010-1080) may be repeated until a stopping condition is reached. The stopping condition may include, for example and without limitation, completion of a preset number of iterations (e.g., 100 iterations) or processing of all the images in the training set. Responsive to determining that the training of the neural light field network is complete, the computing system (e.g., computing system 1000) may perform novel view synthesis of a particular scene using the trained neural light field network at inference time. The particular scene may include a pose that was not seen or observed during the training of the neural light field network.

In some embodiments, the computing system (e.g., computing system 1100) may supervise or regularize the training of the neural light field network, as discussed above with respect to steps 1010-1080, using a trained neural radiance field (NeRF) network. In some embodiments, supervising the training of the neural light field network using the trained NeRF network may include using output images generated by the trained NeRF network as the training images for training the neural light field network. In other embodiments, supervising the training of the neural light field network using the trained NeRF network may include using output images generated by the trained NeRF network as ground-truth images for comparing predicted color values generated by the neural light field network with true color values associated with the ground-truth images.

In some embodiments, when the training image used in the method 1000 belongs to the sparse training dataset, then the computing system (e.g., computing system 1100) may subdivide the 3D space associated with a scene into a plurality of local light fields, where each local light field may include its own ray space embedding network, and use each local light field of the plurality of local light fields to generate a separate color value for a pixel of the training image. Using each local light field to generate a separate color value for the pixel may include (1) generating a second ray with third ray coordinates by intersecting the ray into a voxel comprising the local light field, (2) mapping the third ray coordinates of the second ray into a second embedding network, (3) transforming, using the second embedding network, the third ray coordinates into fourth ray coordinates, (4) applying second positional encoding to fourth ray coordinates, and (5) generating, using the neural light field network, a second predicted color value for the pixel based on positionally encoded fourth ray coordinates. Once second predicted color values are generated for the plurality of local light fields, the computing system (e.g., computing system 1100) may combine these second predicted color values to generate a combined predicted color value for the pixel.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for training a neural light field network for view synthesis, including the particular steps of the method of FIG. 10, this disclosure contemplates any suitable method for training a neural light field network for view synthesis, including any suitable steps, which may include a subset of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Example Computer System

Figure 11:
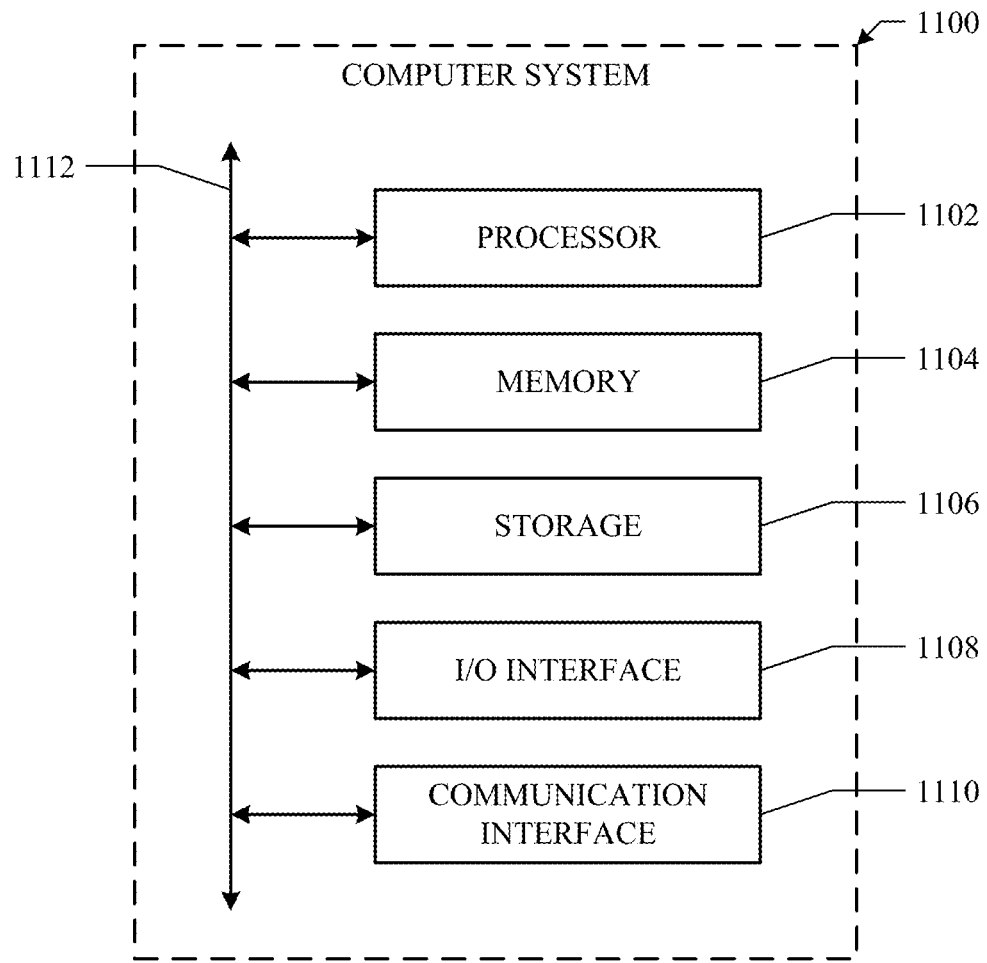
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   accessing a set of training images to facilitate training a neural light field network associated with view synthesis; and using the set of training images to train the neural light field network by:
  casting, for pixels of the set of training images, a ray into a three-dimensional (3D) space, wherein the ray comprises integrated radiance along the ray;
  mapping first ray coordinates of the ray into an embedding network;
  transforming, using the embedding network, the first ray coordinates into second ray coordinates;
  applying positional encoding to the second ray coordinates;
  generating, using the neural light field network, a predicted color value for the pixels based on positionally encoded second ray coordinates;
  comparing the predicted color value for the pixels with a ground-truth color value for the pixels; and
  updating the neural light field network and the embedding network based on comparison.

2. The method of claim 1, wherein the set of training images comprises a dense training dataset, the dense training dataset being obtained by capturing a large number of training images with camera viewpoints or positions located close to each other.

3. The method of claim 1, wherein the set of training images comprises a sparse training dataset, the sparse training dataset being obtained by capturing a fewer number of training images with camera viewpoints or positions located distant apart.

4. The method of claim 3, further comprising:
  subdividing the 3D space associated with a scene into a plurality of local light fields, wherein the plurality of local light fields comprises a distinct ray space embedding network;
  using the plurality of local light fields to generate a separate color value for the pixels by:
    generating a second ray with third ray coordinates by intersecting the ray into a voxel comprising the plurality of local light fields;
    mapping the third ray coordinates of the second ray into a second embedding network;
    transforming, using the second embedding network, the third ray coordinates into fourth ray coordinates;
    applying second positional encoding to fourth ray coordinates;
    generating, using the neural light field network, a second predicted color value for the pixels based on positionally encoded fourth ray coordinates; and
  combining second predicted color values associated with the plurality of local light fields into a combined predicted color value for the pixels.

5. The method of claim 4, wherein the plurality of local light fields are associated with a particular voxel of a plurality of voxels in the 3D space, wherein the plurality of voxels are identified by:
  shooting the ray into the 3D space; and
  identifying point of intersections of the ray at different positions in the 3D space.

6. The method of claim 1, further comprising:
  supervising the training of the neural light field network using a trained neural radiance field (NeRF) network.

7. The method of claim 6, wherein the supervising the training of the neural light field network using the trained NeRF network comprises using output images generated by the trained NeRF network as other training images to train the neural light field network.

8. The method of claim 6, wherein the supervising the training of the neural light field network using the trained NeRF network comprises using output images generated by the trained NeRF network as ground-truth images to compare predicted color values generated by the neural light field network with true color values associated with the ground-truth images.

9. The method of claim 1, wherein the ray coordinates comprise four-dimensional light field coordinates.

10. The method of claim 1, wherein the ray is parameterized with two planes, wherein a first plane is located at a certain distance and position from a second plane.

11. The method of claim 1, wherein the embedding network comprises a latent space to represent correspondences between rays associated with pixels of the set of training images.

12. The method of claim 1, wherein the neural light field network comprises a neural network or a multi-layer perceptron (MLP).

13. The method of claim 1, wherein the transforming the first ray coordinates into the second ray coordinates comprises local affine transformation of the ray.

14. The method of claim 13, wherein the local affine transformation of the ray divides the ray into a plurality of sub rays.

15. The method of claim 1, wherein the transforming the first ray coordinates into the second ray coordinates comprises transforming an ill-parameterized ray space into an axis-aligned ray space.

16. The method of claim 1, wherein the predicted color value for the pixels are generated based on an evaluation of the neural light field network.

17. The method of claim 1, further comprising;
  performing the view synthesis of a particular scene using the trained neural light field network at inference time.

18. The method of claim 17, wherein the particular scene comprises a pose that was not seen or observed during the training of the neural light field network.

19. A non-transitory computer-readable medium storing instructions that, when executed, cause:
  access a set of training images to facilitate training a neural light field network associated with view synthesis; and
  use the set of training images to train the neural light field network by:
    casting, for pixels of the set of training images, a ray into a three-dimensional (3D) space, wherein the ray comprises integrated radiance along the ray;
    mapping first ray coordinates of the ray into an embedding network;
    transforming, using the embedding network, the first ray coordinates into second ray coordinates;
    applying positional encoding to the second ray coordinates;
    generating, using the neural light field network, a predicted color value for the pixels based on positionally encoded second ray coordinates;
    comparing the predicted color value for the pixels with a ground-truth color value for the pixels; and
    updating the neural light field network and the embedding network based on comparison.

20. A system comprising:
  one or more processors; and
  at least one memory storing instructions, that when executed by the one or more of the processors, cause the system to:
    access a set of training images to facilitate training a neural light field network associated with view synthesis; and use the set of training images to train the neural light field network by:
  casting, for pixels of the set of training images, a ray into a three-dimensional (3D) space, wherein the ray comprises integrated radiance along the ray;
  mapping first ray coordinates of the ray into an embedding network;
  transforming, using the embedding network, the first ray coordinates into second ray coordinates;
  applying positional encoding to the second ray coordinates;
  generating, using the neural light field network, a predicted color value for the pixels based on positionally encoded second ray coordinates;
  comparing the predicted color value for the pixels with a ground-truth color value for the pixels; and
  updating the neural light field network and the embedding network based on comparison.

* * * * *